(12) United States Patent
Ahmadvand et al.

(10) Patent No.: US 11,960,555 B2
(45) Date of Patent: Apr. 16, 2024

(54) ATTENTIVE PSEUDO-RELEVANCE FEEDBACK NETWORK FOR QUERY CATEGORIZATION

(71) Applicant: Home Depot Product Authority, LLC, Atlanta, GA (US)

(72) Inventors: Ali Ahmadvand, Atlanta, GA (US); Sayyed M. Zahiri, Atlanta, GA (US); Simon Hughes, Atlanta, GA (US); Khalifeh Al Jadda, Atlanta, GA (US); Surya Kallumadi, Atlanta, GA (US); Eugene Agichtein, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 17/685,130

(22) Filed: Mar. 2, 2022

(65) Prior Publication Data

US 2022/0284066 A1    Sep. 8, 2022

Related U.S. Application Data

(60) Provisional application No. 63/155,903, filed on Mar. 3, 2021.

(51) Int. Cl.
*G06F 16/9535* (2019.01)
*G06F 16/906* (2019.01)
*G06F 16/9532* (2019.01)
*G06F 16/9538* (2019.01)

(52) U.S. Cl.
CPC ........ *G06F 16/9535* (2019.01); *G06F 16/906* (2019.01); *G06F 16/9532* (2019.01); *G06F 16/9538* (2019.01)

(58) Field of Classification Search
CPC .............. G06F 16/9535; G06F 16/906; G06F 16/9532; G06F 16/9538; G06F 16/3322
See application file for complete search history.

(56) References Cited

U.S. PATENT DOCUMENTS

| | | | |
|---|---|---|---|
| 11,531,863 B1* | 12/2022 | Zweig | G06F 40/30 |
| 2010/0250526 A1 | 9/2010 | Prochazka et al. | |
| 2017/0031904 A1* | 2/2017 | Legrand | G06F 16/34 |
| 2019/0278857 A1* | 9/2019 | Ni | G06F 16/3344 |
| 2019/0294692 A1* | 9/2019 | Zhao | G06F 16/24578 |
| 2020/0311800 A1 | 10/2020 | Srinivasan et al. | |

(Continued)

FOREIGN PATENT DOCUMENTS

| | | |
|---|---|---|
| WO | 2008133368 A1 | 11/2008 |
| WO | 2014162033 A1 | 10/2014 |

OTHER PUBLICATIONS

ISA/US, ISR / WO issued in Appl. No. US2022/018693, dated Jul. 19, 2022, 11 pgs.

(Continued)

*Primary Examiner* — Albert M Phillips, III
*Assistant Examiner* — Fatima P Mina
(74) *Attorney, Agent, or Firm* — Greenberg Traurig, LLP

(57) ABSTRACT

A method of providing results from a search engine comprises generating an initial set based on a query received from a user; generating an attention value based on the query and on the initial set; applying the attention value to the initial set; and presenting a set of results in response to the query, wherein the results are generated according to the application of the attention value to the initial set.

18 Claims, 4 Drawing Sheets

(56) References Cited

U.S. PATENT DOCUMENTS

2020/0410320 A1* 12/2020 Almazán ............... G06N 3/084
2021/0374395 A1* 12/2021 Tata .................... G06V 30/416

OTHER PUBLICATIONS

P. Bojanowski, E. Grave, A. Joulin, and T. Mikolov. Enriching word vectors with subword information. TACL, ACL, 5:135-146, 2017.

B. Jiang and X. Liu. Scaling of geographic space from the perspective of city and field blocks and using volunteered geographic information. International Journal of Geographical Information Science, 26(2):215-229, 2012.

Y. Kim. Convolutional neural networks for sentence classification. In EMNLP, 2014.

V. Lavrenko and W. B. Croft. Relevance-based language models. In ACM SIGIR Forum, vol. 51, pp. 260-267. ACM New York, NY, USA, 2017.

C. Li, Y. Sun, B. He, L. Wang, K. Hui, A. Yates, L. Sun, and J. Xu. Nprf: A neural pseudo relevance feedback framework for ad-hoc information retrieval. arXivpreprint arXiv:1810.12936, 2018.

J. Liu, W.-C. Chang, Y. Wu, and Y. Yang. Deep learning for extreme multi-label text classification. In SIGIR, pp. 115-124. ACM, 2017.

M.-T. Luong, H. Pham, and C. D. Manning. Effective approaches to attention based neural machine translation. arXiv preprint arXiv:1508.04025, 2015.

A. Montazeralghaem, H. Zamani, and J. Allan. A reinforcement learning framework for relevance feedback. In SIGIR, pp. 59-68, 2020.

J. Nam, J. Kim, and et al. Large-scale multi-label text classification-revisiting neural networks. In ECML PKDD, pp. 437-452. Springer, 2014.

Y. Song, H. Wang, W. Chen, and S. Wang. Transfer understanding from head queries to tail queries. In CIKM, pp. 1299-1308, 2014.

G. Wang et al. Joint embedding of words and labels for text classification. arXiv preprint arXiv:1805.04174, 2018.

D. Yin, Y. Hu, J. Tang, T. Daly, M. Zhou, H. Ouyang, J. Chen, C. Kang, H. Deng, C. Nobata, et al. Ranking relevance in yahoo search. In KDD, 2016.

H. Zhang, X. Song, C. Xiong, C. Rosset, P. N. Bennett, N. Craswell, and S. Tiwary. Generic intent representation in web search. In SIGIR, pp. 65-74. ACM, 2019.

J. Zhao, H. Chen, and D. Yin. A dynamic product-aware learning model for e-commerce query intent understanding. In CIKM, pp. 1843-1852. ACM, 2019.

* cited by examiner

ATTENTIVE PSEUDO-RELEVANCE FEEDBACK NETWORK FOR QUERY CATEGORIZATION

CROSS-REFERENCE TO RELATED APPLICATION

This application claims the benefit of U.S. Provisional Patent Application No. 63/155,903, filed Mar. 3, 2021, the content of which are hereby incorporated by reference in its entirety and for all purposes.

TECHNICAL FIELD

This disclosure relates to categorization of user search queries.

BACKGROUND

Items, such as products or services, may be searched for by users of an electronic interface, such as a website. A search engine generates results that are responsive to the search query.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Search engines receive a user search query and generate a list of outputs that are responsive to the search query. In the context of a website, the search engine may significantly influence the documents or information that are presented to a user in response to the user's search queries. Understanding the user's intent in search queries can help the search engine present the most relevant results.

Effective query categorization can enhance query intent understanding. A common query categorization task is to select one or more relevant fine-grained document categories in a document taxonomy. For frequent queries, rich user behavior (e.g., click-through data) can be used to infer the relevant categories. While this method may be adequate for common queries (e.g., head queries), for more uncommon or unusual queries (e.g., tail queries), which cover a large volume of search traffic, relying solely on user behavior might not suffice due to the low number of data points. A novel query enhancement system according to the present disclosure may improve upon known systems and methods by refining query results according to attention values calculated based on embeddings vectors, which enables a search engine to present results that are more relevant and accurate.

Figure 1:
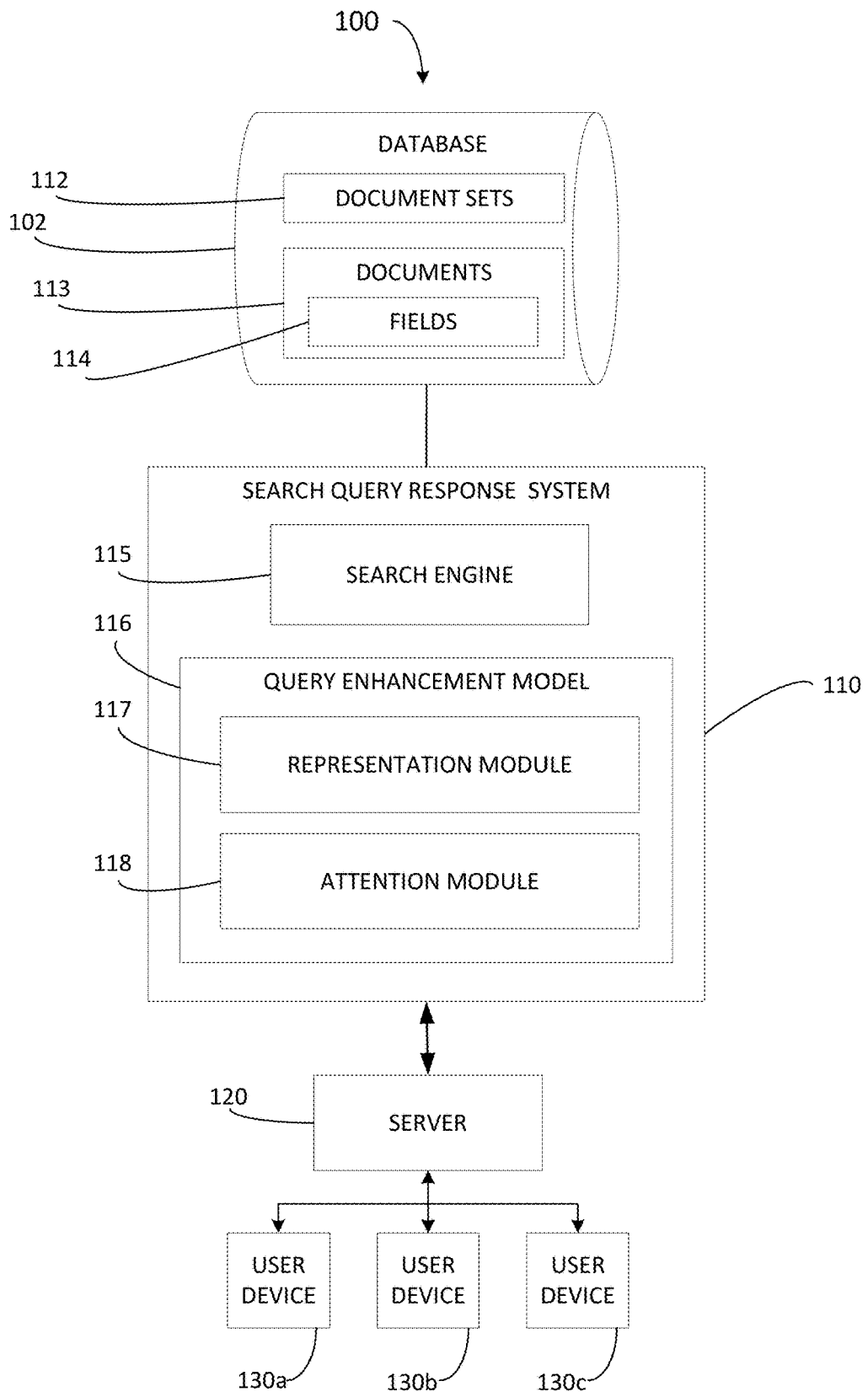
FIG. 1 is a diagrammatic view of a system for responding to a user search query.

Referring now to the drawings, wherein like numerals refer to the same or similar features in the various views, FIG. 1 shows an example system 100 for responding to a user search query. The system 100 includes a document database 102, a search query response system 110, and a server 120, each of which may be made up of a combination of hardware and/or software. The search query response system 110, or one or more components or portions thereof, may execute one or more of the processes, methods, algorithms, etc. of this disclosure.

The search query response system 110 may be deployed in association with a server 120 that may serve an electronic user interface, such as a website and/or data for a mobile application for access by one or more users. The interface may provide access to documents, such as the documents 113 discussed below. The server 120 may be connected to one or more networks such as the Internet, intranets, extranets, wide area networks (WANs), local area networks (LANs), wired networks, wireless networks, or other suitable networks, etc., or any combination of two or more such networks.

The search query response system 110 and/or server 120 may comprise, for example, one or more server computing systems and/or any other appropriate system providing computing capability, including a non-transitory computer-readable medium storing instructions and a processor configured to execute those instructions to perform one or more functions, methods, processes, etc. of this disclosure. In some embodiments, the search query response system 110 and server 120 may comprise the same or shared computing resources (e.g., are hosted by the same computing system), while in other embodiments, the search query response system 110 and server 120 may comprise different computing resources (e.g., are hosted by separate computing systems). These computing resources, whether shared or separate, may be any computing resources appropriate for the systems and methods described herein.

Various applications and/or functionality may be executed in the search query response system 110. Also, various data may be stored in the database 102 or other memory that is accessible to the search query response system 110. The database 102 may include one or more databases.

The database 102 may store document data at three levels of abstraction: document sets (e.g., corpora) 112, individual documents 113, which documents 113 may include document fields 114. In some embodiments, the database 102 may store data respective of products or services, in which each individual documents 113 is an information page respective of a particular product or service. The database 102 may store separate types of document data (i.e., other than products and services), in the same or different embodiments, and the system 100 is not limited to sue with product and service data. To the contrary, the system 100 may find use with any type of electronic documents that may be identified in response to a user search query in an electronic interface. Furthermore, the instant disclosure discusses specific embodiments in which a search engine is deployed on an e-commerce platform, and therefore that the relevant categories and user intents relate to products. It should be understood, however, that the techniques, processes, etc. of this disclosure may be applicable to search engines in other contexts, and therefore the categories and user intents relevant to the techniques, processes, etc. may be unrelated to products, in some embodiments.

Fields 114 may be relatively smaller or more granular than entire documents, and may include details of the contents of a document, such as title, color, brand, etc. (e.g., in embodiments in which the documents are respective of products or services). Documents 113 may each be associated with a respective product, and may be formed by or associated with one or more fields. Sets 112 may be groups or sets of documents. For example, a set (or corpus) may be a set of bathroom sinks, a document may be a particular bathroom sink, and a field may be a brand of the particular bathroom sink. By storing product data at different levels of abstraction, the product database 102 may provide a rich dataset for the query enhancement model 116.

The server 120 may be in electronic communication with one or more user device(s) 130*a*, 130*b*, 130*c* (which may be referred to individually as a user device 130 or collectively as user devices 130) over a network. A client device 130 may be, for example, a cell phone, laptop, personal computer, mobile device, or any other computing device used by a user. The client device 130 may include an application such as a web browser or mobile application that communicates with the server 120 to access electronic user interface provided by the server 120, to submit search queries, and to receive responses to such search queries, including search results.

The search query response system 110 may include a search engine 115 and a query enhancement model 116, which may generate data and store the data on the database 102 and/or access the contents of the database 102.

The search engine 115 may receive search queries and generate responsive results. These search results may include data from the product database 102 (e.g., a ranked list of documents that are responsive to the initial query). For example, in embodiments in which the documents are respective of products and services, the search engine 115 may provide a ranked list of products and services in response to a user search query.

The query enhancement model 116 may improve the relevancy and accuracy of query results (e.g., relative to query results determined according to known processes) through an analysis of results from the search engine 115 in the context provided by the sets 112, documents 113, and fields 114 in the product database 102. In some embodiments, the query enhancement model 116 may receive an initial set of results (e.g., a list of documents) from the search engine 115, which itself generated the results in response to a query from a user. The query enhancement model 116 may then analyze the initial set of results to determine a category or classification for the query. The determined category may be a product category, for example, or another document category. The determined category may be used by the system 100 to respond to the user's search query. The response may be, for example, search results (e.g., including a subset of the initial results), directing the user to a page respective of the determined category, provide a query suggestion, or another response type.

Through training one or more machine learning models that embody the query enhancement model 116, a set of categories from which the category is determined may be derived from user interaction data. For example, the set of categories may be derived from user interaction data by analyzing user navigation histories to determine which documents were interacted with the most and generating an initial set of categories as the categories of those interacted-with documents. From there, the total number of interactions (e.g., clicks) may be determined for each category as an aggregate of interactions with each document of the category, and a final set of categories may be determined as those categories above a certain threshold (e.g., a total number of interactions, a percentage of the total interactions, etc.).

The query enhancement model 116 may include a representation module 117 and an attention module 118, which modules 117, 118 may be embodied in one or more machine learning models. An example model is described below with respect to FIG. 3. The representation module 117 may determine vectors representative of the documents in the initial set of query results using data at multiple levels of abstractions and a vector representative of the query. The representation module 117 may break each document in the initial results down into field-level components and generate representative vectors based on these field-level components. In some embodiments, the representation module 117 determines word-level embeddings and character-level embeddings for each word in each field. The character-level embeddings may be used to adjust or refine the word-level embeddings, which may be used to determine the field embeddings. Because these field embeddings vectors generated are representative of the query results, by refining the embeddings to character-level detail, the field embeddings may compensate for typos or other morphological errors inherent in user-generated text.

The attention module 118 may determine an attention value based on the vectors determined by the representation module 117. The attention module 118 may include a machine learning model trained to generate such attention values. This attention value may be a matrix or multi-dimensional vector that can be applied to a dataset (e.g., the initial set of results responsive to the query) to emphasize or highlight particular datapoints. For example, the determined attention value may provide weights to each document in the initial set of results, with greater weight indicating a greater relevance or accuracy relative to the query.

The attention value may be a hierarchical attention value, such that the final attention value applied to the dataset is determined via an iterative process that includes calculating attention values at each level (or hierarchy) of data abstraction, with each calculated attention value being an input for the attention value calculation at a subsequent level of data abstraction. For example, a final attention value may be a set-level attention value calculated, in part, using a document-level attention value, which in turn may be calculated using a field-level attention value. In this way, the final attention value may simultaneously capture relevancy on the macro (e.g., set) and micro (e.g., field) levels.

For example, the attention module 118 may determine a field-level attention value using an attention operation (e.g., a Luong-style attention operation), where the field-level attention value may be a stack of attention layers that correspond to the field embeddings and the initial set of results to the query (e.g., a pre-determined number of most relevant documents). As such, the field-level attention value may be a stack of one-dimensional vectors that each correspond to a single field embeddings. From there, the field-level attention value may be used to determine a document-level attention value. In one embodiment, an attention matrix for each document may be a stack of the field-level attention value for each field that is included in the document. For example, the attention matrix for a document directed to a particular bathroom sink may be a stack of the field-level attention values associated with the brand of the bathroom sink, the color of the bathroom sink, the material of the bathroom sink, etc. Once each document attention matrix is generated, the matrices are input into another attention layer to generate a single matrix that stands as the document-level attention value for the documents 113 relative to the initial set of results. In some embodiments, the document attention matrix may be determined according to the following equation (1):

$$Att_{QD}=[Q\odot Att_{D_0}; \ldots ; Q\odot Att_{D_K}], Att_{QD}\in R^{K\times D} \quad (1)$$

where Q is the query, $Att_{D_k}$ is a document attention value for the 'k-th' document, $\odot$ indicates the attention layer, K is the number of documents returned as part of the initial set of results (e.g., a pre-determined number for relevancy) and 1<k<K, and D is the dimension of document attention. The field attention matrix may be similarly determined by replacing the D-values above with corresponding F-values (e.g., 'field' values).

The document-level attention value may then be used determine the final attention value (e.g., a set-level attention value). In some embodiments, the document-level attention value matrix is input into a self-attention layer for each document in the initial set of results, with the resultant matrices pooled into a single matrix representative of the set-level attention value. This resultant single matrix may be, therefore, the result of attention values determined at three different levels of data abstraction. In some embodiments, the set-level attention value may be determined according to the following equation:

$$Att_{QC}=\text{Maxpooling}(\text{selfattention}(Att_{QD}), Att_{QC}\in R^{1\times C} \quad (2)$$

where $Att_{QD}$ is the document attention value from equation 1 above and C is the dimension of set (or corpus) attention.

In operation, a user of a user computing device 130 may access the electronic interface hosted by the server 120 and may enter a search query. The server 120 may receive the query and generate an initial set of responsive results based on the documents 113 and/or other information available to the search engine 115. The model 116 may receive the initial results, determine a recommended category based on the initial results within the context of the query, and either provide final results to the server 120 for provision directly to the user (e.g., the user device 130) in response to the search query or provide the recommended category to the search engine 115 that provides an updated set of results in response to the search query, and/or provide another response to the user in response to the query.

Figure 2:
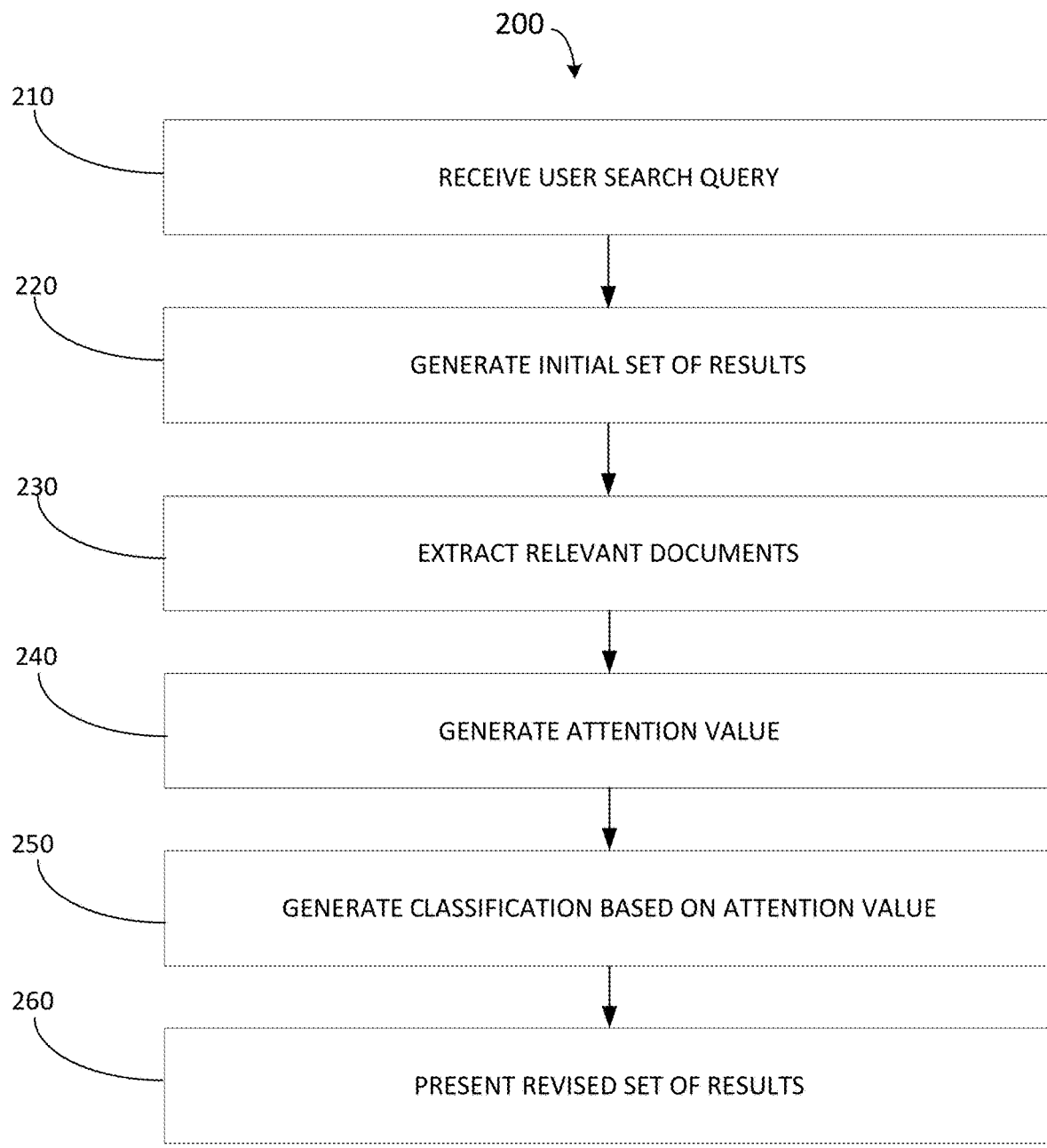
FIG. 2 is a flow chart illustrating an example method of responding to a user search query.

FIG. 2 is a flow chart illustrating an example method 200 of responding to a user search query. The method 200, or one or more portions of the method 200, may be performed by the search query response system 110, and more particularly by the query enhancement model 116, in some embodiments.

The method 200 may include, at block 210, receiving the user search query and, at block 220, generating an initial set of results in response to the user search query. The user search query may be received through an electronic user interface, such as a website or mobile application. Initial search results at block 220 may be generated by the search engine 115, for example. As discussed above, the initial set of results may include a ranked list of documents, or may include a pre-determined number of the most relevant documents (e.g., a corpus). The pre-determined number, as well as the criteria for most relevant, may be particular to the search engine 115 and separate from the query enhancement model 116. As such, the documents that the search engine 115 determines to be the most relevant may be different than those documents that the query enhancement model 116 determines to be most relevant.

The method 200 may further include, at block 230, extracting relevant data from documents associated with the initial set of results. For example, the query enhancement model 116 may derive one or more fields corresponding to each query result document. In some embodiments, the query enhancement model 116 may derive the fields by retrieving, from the document database 102, the fields 114 associated with each query result document. In other embodiments, the query enhancement model 116 may methodically derive the fields through an analysis of the retrieved documents. For example, the query enhancement model 116 may, for each document, cull field information from the query result documents.

In some embodiments, the query enhancement model 116 (and more particularly, the representation module 117) may use the extracted field-level data to determine embeddings representative of the fields. As discussed above with reference to the representation module 117, field embeddings may be generated using word-level embeddings representative of the word(s) in each field. In addition, those word-level embeddings may be refined by character-level embeddings, which can insulate the field embeddings from typos and other morphological errors inherent in user-generated data.

The method 200 may further include, at block 240, generating an attention value based on the initial set of results based on a document context. The attention value may be generated according to a machine learning model trained to generate such attention values. As discussed above with reference to the attention module 118, the generated attention value may be a hierarchical attention value, such that the attention value for each level of data abstraction (e.g., set-level, document-level, etc.) may be determined based on the previous (e.g., more granular) level's attention value. An example model is described below with respect to FIG. 3.

The method 200 may further include, at block 250, generating a category (or other classification) based on the determined set-level attention value from block 240. This category may be a result of combining or concatenating the set-level attention value with the initial set of results. For example, the set of embeddings vectors corresponding to the initial set of results is multiplied by the set-level attention value, with the resultant vectors essentially indicative of a weighted set of results. The category here may then be based on a weighted set of results (e.g., with a higher weight assigned to more relevant or accurate results), such that the category is determined based on the documents with the highest weight.

The method 200 may further include, at block 260, presenting a revised set of results based on the category. In some embodiments, the initial set of results may be filtered or sorted based on the determined category to create the revised results. In some of these embodiments, the revised set of results may be the entire list of the initial set of results but re-ordered based on relevance to the determined category, or may be a sub-set of the initial set of results that include only a certain number of the higher-weighted documents (e.g., including only those documents that belong to the determined category). Additionally or alternatively, block 260 may include outputting a single document that is most relevant or matches most closely to the determined category. In yet another embodiment, the revised set of results may be a query suggestion, such that the user is presented with a plaintext word or phrase that the query enhancement model 116 determined to be a more relevant or accurate query for the user. For example, if the initial query is "discount micrwavs," a phrase "Did you mean 'discount microwaves'?" may be presented. In another example, if the initial query is "dishwasher and dryer combos," a phrase "Did you mean 'laundry washer and dryer combos'?" may be presented.

Figure 3:
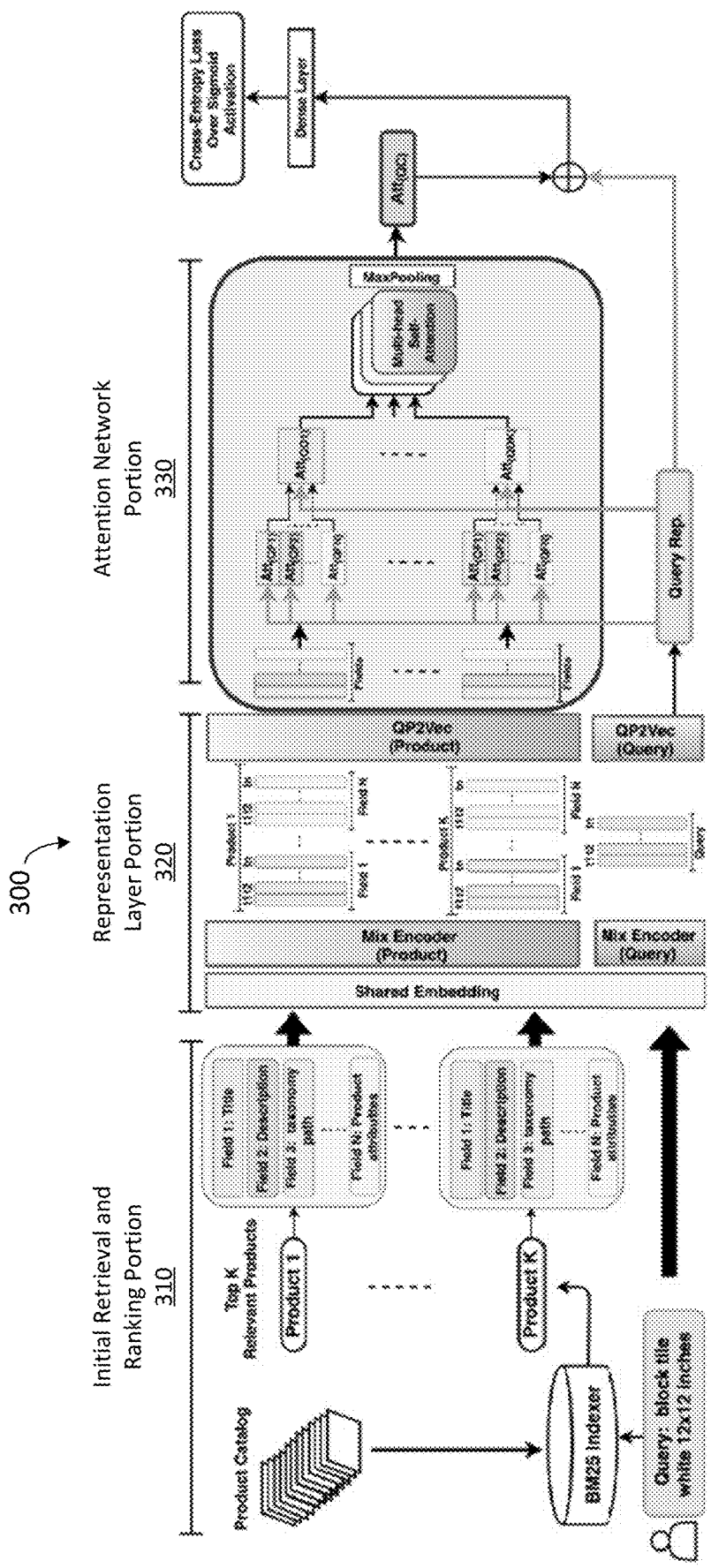
FIG. 3 is a diagrammatic view of an example machine learning model for generating an attention value responsive to a user search query.

FIG. 3 is a diagrammatic view of an example machine learning model 300 for generating an attention value responsive to a user query. The model may include an initial retrieval and ranking portion 310, a representation layer portion 320, and an attention network portion 330, in some embodiments.

In some embodiments, the machine learning model 300 may be trained using data stored in the database 102. For example, the database may include unlabeled data and training data. Unlabeled data may include a history of search queries and their respective associated navigation history. For example, a search for "discount electric drill" may be a user's search query included in unlabeled data, and its corresponding navigation history may include the various webpages that the user visited and other actions taken by the user (e.g., purchasing items) in response to being presented with the results to the search query, which navigation history may also be included in unlabeled data. The reference to data being "unlabeled" indicates that the data has not been processed or otherwise tagged with labels for purposes of training a classifier.

Training data includes data that has been labeled for purposes of training a classifier. The training data may include, for example, paired user queries and a defined user intent associated with each query, and/or paired user queries and one or more product categories in which the user intended to obtain search results. For example, the training data may be labeled by leveraging navigation history to associate queries with document categories, determining the percentage of total user interaction (e.g., from the navigation history) associated with each category, and labeling queries with categories that are above a certain threshold of user interaction (e.g., 5% of total interaction).

The initial retrieval and ranking portion 310 may include an indexer for returning an initial set of results responsive to a user query. In some embodiments, the indexer may be a function of the search engine 115. In other embodiments, a search engine may provide an initial set of search results, and those search results may be ranked by an indexer separate from the search engine. The indexer may output a predetermined quantity of documents selected from the documents determined by the search engine to be responsive to the user query.

The initial retrieval and ranking portion 310 may further include a field determination portion in which component information fields (and the information in those fields) are determined and extracted from each document output by the indexer. In some embodiments, the documents on which the model 300 operates have a known and predictable format, and the fields may be determined according to known processes The representation layer portion 320 may include a shared embedding layer that receives the extracted field data from the initial retrieval and ranking portion 310 and determines embeddings for both the field data as well as the query. These embeddings are then received by a mix encoder layer that, as discussed above with reference to block 220 of the method 200, may generate word- and character-level embeddings that, when processed by the query-product-to-vector layer, inform and refine the field embeddings. In some embodiments, the field data and the query may be processed by the same layers, while in other embodiments, the field data may be processed by a first set of layers and the query may be processed by a second set of layers.

The attention network portion 330 may include a hierarchical attention network that calculates an attention value for each level of data abstraction, with the output attention value for one level used as an input for the next (e.g., less granular) level. As shown in FIG. 3 and as discussed above with reference to the attention module 118, the attention network portion 330 may first determine a field attention value for each field based on the field embeddings and the query embeddings from the representation layer portion. The field attention values for each field in a document may then be stacked and used, with the query embeddings, to determine a document attention value. The document attention values for all documents in the set (e.g., the initial query results) may then be processed by a multi-head self-attention (e.g., with K heads) and pooled to determine a set-level attention value. Multi-head self-attention may contain several linear projections of a single scaled dot-product function that are parallelly implemented. In one example, a single head of the self-attention mechanism may be represented asy:

$$\text{head}_i = \text{softmax}\left(\frac{q_t K^T}{\sqrt{d_k}}\right) V \qquad (3)$$

where each projection is responsible for extracting the attention on a word in a query, which may be represented as Self Attention($q_t$)=MaxPooling(($\text{head}_1$, . . . , $\text{head}_h$)W), where W is the weights of a linear function. The set-level attention value may be concatenated with the query embeddings, both of which are merged in a dense layer that may determine or provide a category for the query based on the concatenated result.

Enhancing query results according to the present disclosure may provide numerous benefits over existing query methods. First, by evaluating and refining search results on a field-level, the system 100 provides results that are more relevant and accurate than existing methods that may operate on a less detailed level. Second, because the relevance of the initial set of results is determined, in part, by matrices and vectors, the underlying process behind determining relevant results is more streamlined and involves fewer operations than existing methods that utilize one-to-one comparisons of query terms to each possible product or result. Third, because the search results are more relevant and accurate to a user's query, that user spends less time on the e-commerce website. Particular in those embodiments in which the presented result is the single document most relevant to the user's query, the amount of time the user spends navigating is decreased, which, in turn, greatly reduces the load on the web servers. Fourth, in those embodiments in which the query enhancement model 116 presents a query recommendation or suggestion, a user subsequently enters and executes fewer searches, which further reduces the load on the web-servers.

Figure 4:
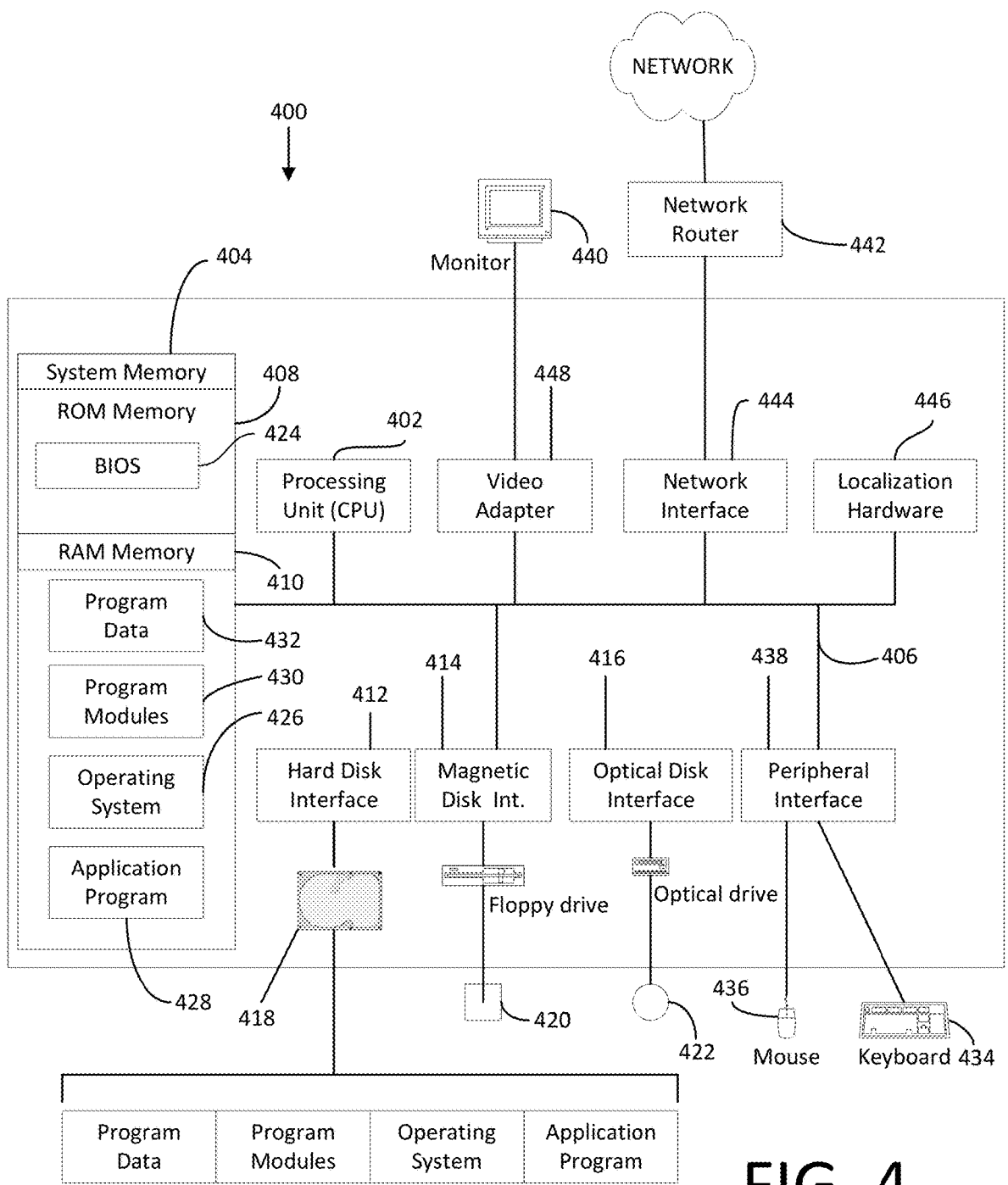
FIG. 4 is a diagrammatic view of an example embodiment of a user computing environment.

FIG. 4 is a diagrammatic view of an example embodiment of a user computing environment that includes a computing system environment 400, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 400 typically includes at least one processing unit 402 and at least one memory 404, which may be linked via a bus. Depending on the exact configuration and type of computing system environment, memory 404 may be volatile (such as RAM 410), non-volatile (such as ROM 408, flash memory, etc.) or some combination of the two. Computing system environment 400 may have additional features and/or functionality. For example, computing system environment 400 may also include additional storage (removable and/or non-removable) including, but not limited to, magnetic or optical disks, tape drives and/or flash drives. Such additional memory devices may be made accessible to the computing system environment 400 by means of, for example, a hard disk drive interface 412, a magnetic disk drive interface 414, and/or an optical disk drive interface 416. As will be understood, these devices, which would be linked to the system bus, respectively, allow for reading from and writing to a hard disk 418, reading from or writing to a removable magnetic disk 420, and/or for reading from or writing to a removable optical disk 422, such as a CD/DVD ROM or other optical media. The drive interfaces and their associated computer-readable media allow for the nonvolatile storage of computer readable instructions, data structures, program modules and other data for the computing system environment 400. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 400.

A number of program modules may be stored in one or more of the memory/media devices. For example, a basic input/output system (BIOS) 424, containing the basic routines that help to transfer information between elements within the computing system environment 400, such as during start-up, may be stored in ROM 408. Similarly, RAM 410, hard disk 418, and/or peripheral memory devices may be used to store computer executable instructions comprising an operating system 426, one or more applications programs 428 (which may include the functionality of the search query response system 110 of FIG. 1 or one or more of its functional modules 117, 118, for example), other program modules 430, and/or program data 432. Still further, computer-executable instructions may be downloaded to the computing environment 400 as needed, for example, via a network connection.

An end-user may enter commands and information into the computing system environment 400 through input devices such as a keyboard 434 and/or a pointing device 436. While not illustrated, other input devices may include a microphone, a joystick, a game pad, a scanner, etc. These and other input devices would typically be connected to the processing unit 402 by means of a peripheral interface 438 which, in turn, would be coupled to bus. Input devices may be directly or indirectly connected to processor 402 via interfaces such as, for example, a parallel port, game port, firewire, or a universal serial bus (USB). To view information from the computing system environment 400, a monitor 440 or other type of display device may also be connected to bus via an interface, such as via video adapter 448. In addition to the monitor 440, the computing system environment 400 may also include other peripheral output devices, not shown, such as speakers and printers.

The computing system environment 400 may also utilize logical connections to one or more computing system environments. Communications between the computing system environment 400 and the remote computing system environment may be exchanged via a further processing device, such a network router 442, that is responsible for network routing. Communications with the network router 442 may be performed via a network interface component 444. Thus, within such a networked environment, e.g., the Internet, World Wide Web, LAN, or other like type of wired or wireless network, it will be appreciated that program modules depicted relative to the computing system environment 400, or portions thereof, may be stored in the memory storage device(s) of the computing system environment 400.

The computing system environment 400 may also include localization hardware 456 for determining a location of the computing system environment 400. In embodiments, the localization hardware 446 may include, for example only, a GPS antenna, an RFID chip or reader, a WiFi antenna, or other computing hardware that may be used to capture or transmit signals that may be used to determine the location of the computing system environment 400.

The computing environment 400, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method of providing results from a search engine, the method comprising:
generating an initial set based on a query received from a user, the initial set corresponding to documents from the search engine;
determining, by a computing device, a vector representative of each document in the initial set of the query;
deriving, by the computing device, one or more fields corresponding to each document of the initial set;
determining, by a model of the computing device, field embeddings representative of each of the one or more fields corresponding to each document of the initial set comprising:
determining, by the model of the computing device, a word-level embeddings and character-level embeddings for each word in the field,
adjusting, by the model of the computing device, the word-level embeddings based on the character-level embeddings, and
determining, by the model of the computing device, the field embeddings based on the adjusted word-level embeddings,
wherein the adjusted word-level embeddings refine the field embeddings to compensate for morphological errors in the documents;
generating, by the model of the computing device, an attention value based on the vector representative of each document in the query and on the refined field embeddings of the initial set;
applying, by the computing device, the attention value to the initial set to generate a first set of results;
determining, by the computing device, a category based on an application of the attention value; and
presenting, by the computing device, a second set of results in response to the query;
wherein the second set of results comprises one or more documents of the initial set determined based on the attention values and on the refined field embeddings.

2. The method of claim 1, wherein the attention value is a set attention value, and wherein generating the set attention value comprises:
generating a field attention value based on the field embeddings and the query;
generating a document attention value based on the field attention value and the query; and
generating the set attention value based on the document attention value.

3. The method of claim 1, wherein applying the attention value to the initial set comprises:
determining document embeddings for each document in the initial set; and
applying the attention value to the document embeddings.

4. The method of claim 3, wherein the second set of results comprise a subset of the initial set based on the category.

5. The method of claim 1, wherein the set of results comprise at least one of:
a query recommendation;
a revised subset of documents from the initial set; or
a document of the revised subset of documents.

6. The method of claim 1, wherein the initial set comprises one or more levels of abstraction, each document of the initial set being allocated to at least one level of abstraction of the one or more levels of abstraction,
wherein the vector representative of each document is based on data associated with each document at the at least one level of abstraction.

7. A system for providing results from a search engine, the system comprising:
a non-transitory, computer-readable medium storing instructions; and
a processor configured to execute the instructions to:
generate an initial set based on a query received from a user;
derive one or more fields corresponding to each document of the initial set;
determine, by a model, a field embeddings representative of each of the one or more fields comprising:
determining, by the model, a word-level embeddings and character-level embeddings for each word in the field,
adjusting, by the model, the word-level embeddings based on the character-level embeddings, and
determining, by the model, the field embeddings based on the adjusted word-level embeddings,
wherein the adjusted word-level embeddings refine the field embeddings to compensate for morphological errors in the documents;
generate, by the model, an attention value based on the query and on the field embeddings of the initial set;
apply the attention value to the initial set to generate a set of results;
determining a category based on an application of the attention value; and
present the set of results in response to the query;
wherein the set of results comprises one or more documents of the initial set determined based on the attention values and on the refined field embeddings.

8. The system of claim 7, wherein the attention value is a set attention value, and wherein generating the set attention value comprises:
generating a field attention value based on the field embeddings and the query;
generating a document attention value based on the field attention value and the query; and
generating the set attention value based on the document attention value.

9. The system of claim 7, wherein applying the attention value to the initial set comprises:
determining document embeddings for each document in the initial set; and
applying the attention value to the document embeddings.

10. The system of claim 9, wherein the set of results comprise a subset of the initial set based on the category.

11. The system of claim 7, wherein the set of results comprise at least one of:
- a query recommendation;
- a revised subset of documents from the initial set; or
- a document of the revised subset of documents.

12. The system of claim 7, wherein the initial set comprises one or more levels of abstraction, each document of the initial set being allocated to at least one level of abstraction of the one or more levels of abstraction,
- wherein the one or more fields representative of each document is based on data associated with each document at the at least one level of abstraction.

13. A method of configuring a search engine, the method comprising:
- generating an initial set of results from a query;
- deriving a set of fields corresponding to each document of the initial set;
- determining, by a neural network, field embeddings representative of the set of fields corresponding to each document of the initial set comprising:
  - determining, by the neural network, a word-level embeddings and character-level embeddings for each word in the set of fields,
  - adjusting, by the neural network, the word-level embeddings based on the character-level embeddings, and
  - determining, by the neural network, the field embeddings based on the adjusted word-level embeddings,
  - wherein the adjusted word-level embeddings refine the field embeddings to compensate for morphological errors in the documents;
- extracting a subset of relevant documents from the initial set of results;
- generate a set attention value based on the query and on the field embeddings of the subset of relevant documents;
- generating a classification based on a combination of the set attention value and the subset of relevant documents; and
- presenting a revised set of results based on the classification;
- wherein the revised set of results comprises one or more documents of the initial set determined based on the set attention value and on the refined field embeddings.

14. The method of claim 13, wherein generating the set attention value comprises:
- generating a field attention value based on the query and a set of fields; and
- generating a document attention value based on the query and on the field attention value,
- wherein the set attention value is generated based on the document attention value.

15. The method of claim 14, further comprising:
- wherein the field attention value is based on the field embeddings.

16. The method of claim 13, wherein the revised set of results comprise at least one of:
- a query recommendation;
- a revised subset of documents from the initial set; or
- a document of the revised subset of documents.

17. The method of claim 13, wherein the classification is determined by a dense layer based on the combination.

18. The method of claim 13, wherein the initial set comprises one or more levels of abstraction, each document of the initial set being allocated to at least one level of abstraction of the one or more levels of abstraction,
- wherein the set of fields representative of each document is based on data associated with each document at the at least one level of abstraction.

* * * * *